Nov. 6, 1923.
J. G. SWAIN
1,473,525
DEMOUNTABLE RIM CONSTRUCTION
Filed Sept. 28, 1921
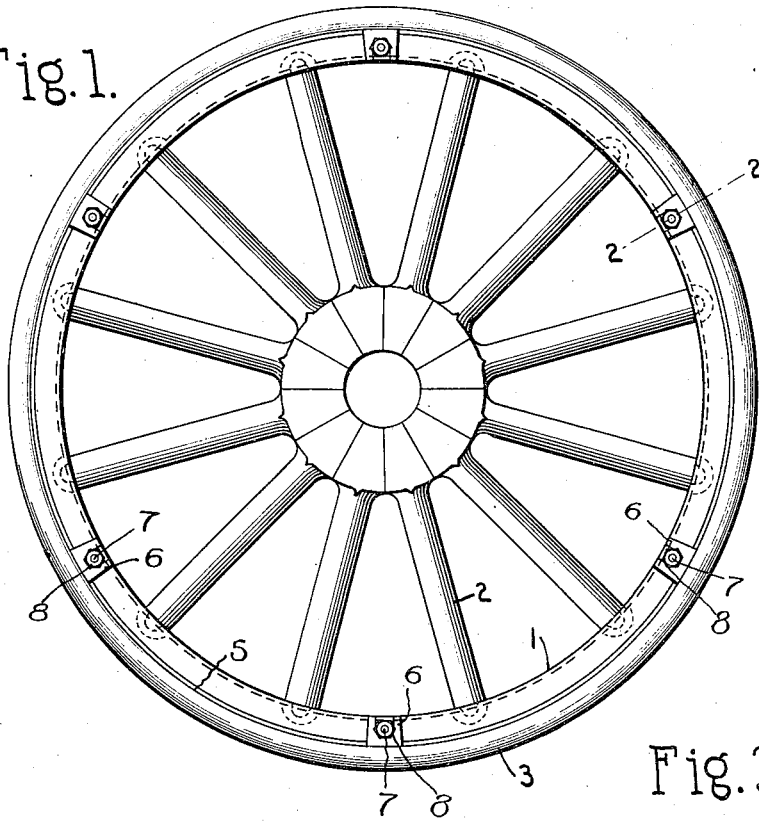
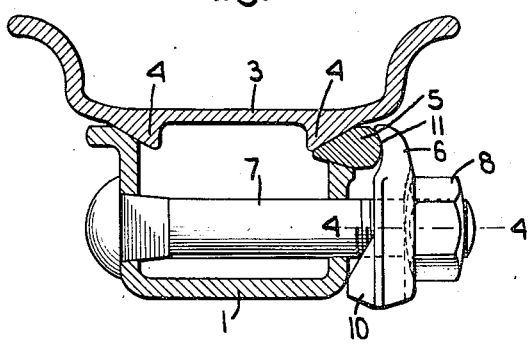
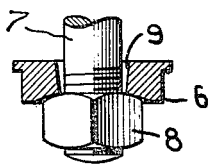
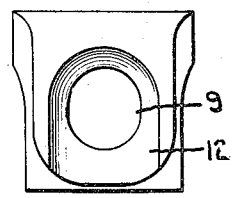
INVENTOR.
Joseph G. Swain
BY
ATTORNEY.

Patented Nov. 6, 1923.

1,473,525

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

DEMOUNTABLE-RIM CONSTRUCTION.

Application filed September 28, 1921. Serial No. 503,935.

*To all whom it may concern:*

Be it known that I, JOSEPH G. SWAIN, a citizen of the United States, residing at Akron, in the county of Summit and State of Ohio, have invented certain new and useful Improvements in Demountable-Rim Constructions, of which the following is a specification.

This invention relates to a demountable rim construction and particularly to the clamping mechanism for forcing the rim on the seat on the felloe or fixed rim of the wheel, the object of the invention being to improve upon the construction of the nut and clamp to obviate certain objections found in former constructions.

In the drawings is shown one form of the invention, it being understood that changes and modifications may be made without departing from the invention or sacrificing any of its benefits.

In the drawings—

Fig. 1 is a side elevation of a wheel carrying a demountable rim such as is utilized for the invention.

Fig. 2 is a section through the clamping bolt on the line 2—2 of Fig. 1.

Fig. 3 is a view showing a clamping lug in cross section.

Fig. 4 is a section on the line 4—4 of Fig. 2.

Fig. 5 is a face view of the clamp.

The invention may be utilized with any form of wheel or rim construction, being here shown as applied to a well known form of steel-felloed wheel in which 1 represents a hollow U-shaped steel felloe or fixed rim, which is seated upon the set of wooden spokes 2. The flanges of the fixed rim or felloe are of different heights, as shown to support the removable tire carrying rim 3, here shown as of the straight side type with beads 4 forming bearing surfaces for the rim. This form of rim is not essential and any seating device may be used.

Between the top of the lower flange and the rim is located a separate tapering locking ring 5, although this element may be part of or supplied by the rim structure, if desired. At the side of the felloe are carried a plurality of clamping lugs or clamps 6 which are received over the ends of bolts 7, nuts 8 bearing against the clamps and serving to force the rim on its seat, the bolts passing through elongated openings 9 in the body of the clamp.

The rear face of the clamp is formed with a shoulder or ridge 10 on its lower edge which bears against the side of the wheel to provide a fulcrum about which the clamp is rocked. The upper edge or moving portion of the clamp is designed to force the rim into position on the felloe and in the form shown is recessed as at 11 to bear against the outer surface of the clamping ring. The invention is not limited to this particular clamping device as any arrangement may be used which forces the rim laterally on the wheel to seating position.

The front face of the clamp is provided with a recess or depression around the hole 9, indicated at 12, which recess is of general scoop-shape, that is the side walls extend toward the fulcrum or to the lower edge of the clamp in straight lines from the semi-circular formation around the upper portion of the hole 9. The under surface of the nut 8 is rounded on the same radius as the trough or recess 12.

As a result of the construction described, as the clamp rocks about the fulcrum 10 a line contact will be maintained at all times between the clamp and the nut, across the trough or recess 12. In prior constructions in which the face of the clamp and the nut were flat, as the nut was tightened the rocking of the clamp tended and often did bend the bolt so as to bring it in conformance with the position of the nut. The same conditions were true where the nut and clamp had a rounded face and a circular socket respectively, as the tendency of the clamp to carry the nut and bolt with it often resulted in the bending or breaking of the end of the bolt.

I am aware of prior constructions in which the clamp was arched or curved and the face of the nut flat, by which a line contact was obtained between the nut and the clamp. The same result is obtained in my invention, by a simple and effective modification of the prior structure.

Claims:

1. In a demountable rim construction, a removable tire carrying rim, and a wheel on which said rim is carried, a clamp at the side of the wheel one end of the clamp being provided with a fulcrum and the other end of the clamp forcing the rim on its seat, a bolt passing through the clamp, a nut on the bolt, bearing against the clamp, the under surface of the nut being rounded and the outer face of the clamp having a radially arranged trough shaped recess, the transverse curvature of which fits the under surface of the nut to provide a line contact between the nut and the clamp.

2. In a demountable rim construction, a wheel, a tire carrying rim removably mounted on the wheel, a plurality of clamps at the side of said wheel, each clamp having a fulcrum bearing against the side of the wheel, the movable end of the clamp forcing the rim on its seat on the wheel, means to force the clamp toward the rim, said means having a rounded surface contacting the clamp, the clamp being formed with a surface which is rounded transversely, but straight radially thereof against which the rounded surface of the said means bears.

3. In a demountable rim construction, a wheel, a tire carrying rim removably mounted on the wheel, a plurality of clamps at the side of said wheel, each clamp having a fulcrum bearing against the side of the wheel, the movable end of the clamp forcing the rim on its seat on the wheel, the clamp having an elongated opening, a bolt on the wheel passing through said opening, a nut on the bolt, the nut having a rounded surface contacting the clamp, said clamp having a recess about the opening to receive the nut, said recess being curved transversely of the clamp, but formed in straight lines radially in the direction of the fulcrum.

JOSEPH G. SWAIN.